United States Patent [19]

Jennings et al.

[11] Patent Number: 4,510,960
[45] Date of Patent: Apr. 16, 1985

[54] VALVE STEM-TO-BONNET BACKSEAT

[75] Inventors: Charles E. Jennings; Claud C. Barrington, both of Houston; Lien-Yan Chen, Spring; Bob C. Hopkins, Houston; John N. McIntyre, Spring; Alfred P. Regitz, Houston, all of Tex.

[73] Assignee: FMC Corporation, Chicago, Ill.

[21] Appl. No.: 538,002

[22] Filed: Sep. 30, 1983

[51] Int. Cl.³ .................. F16K 41/16; F16K 17/38
[52] U.S. Cl. .................................. 137/75; 137/72; 251/330
[58] Field of Search ................ 137/72, 75, 73; 251/330

[56] References Cited

U.S. PATENT DOCUMENTS 2,784,933 3/1957 Newell et al. ............... 251/330 X
4,245,661 1/1981 McGee ........................... 137/72
4,373,700 2/1983 Buchta ......................... 251/330 X Primary Examiner—A. Rosenthal
Attorney, Agent, or Firm—W. William Ritt, Jr.

[57] ABSTRACT

A stem-operated fire-resistant gate valve including an improved metal-to-metal stem backseat a eutectic ring assembly for facilitating automatic stem backseating at pre-selected temperatures, spring enhancement of the backseating procedure, and a lost motion connection between the valve stem and the valve closure element.

21 Claims, 2 Drawing Figures

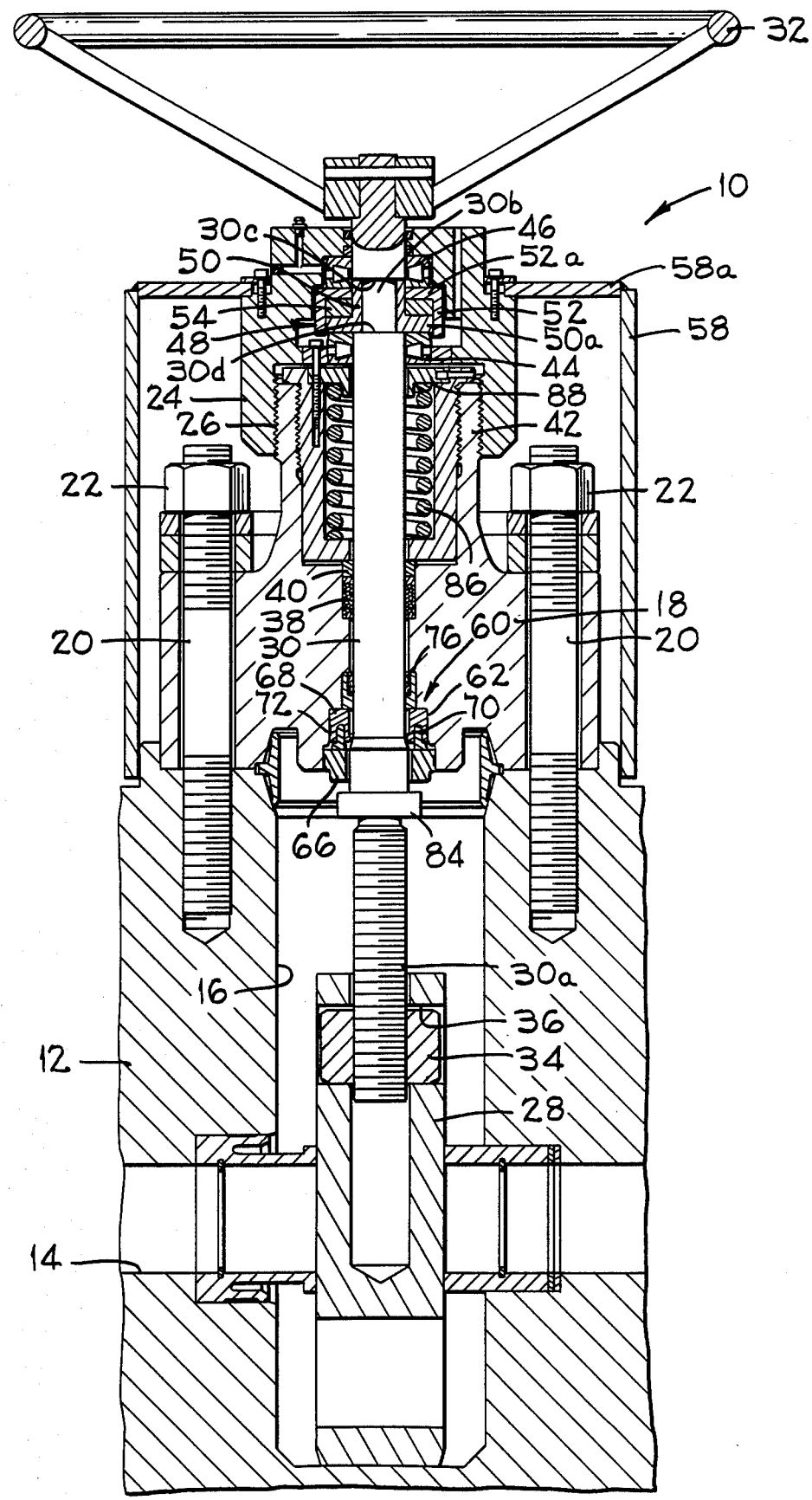
FIG_1

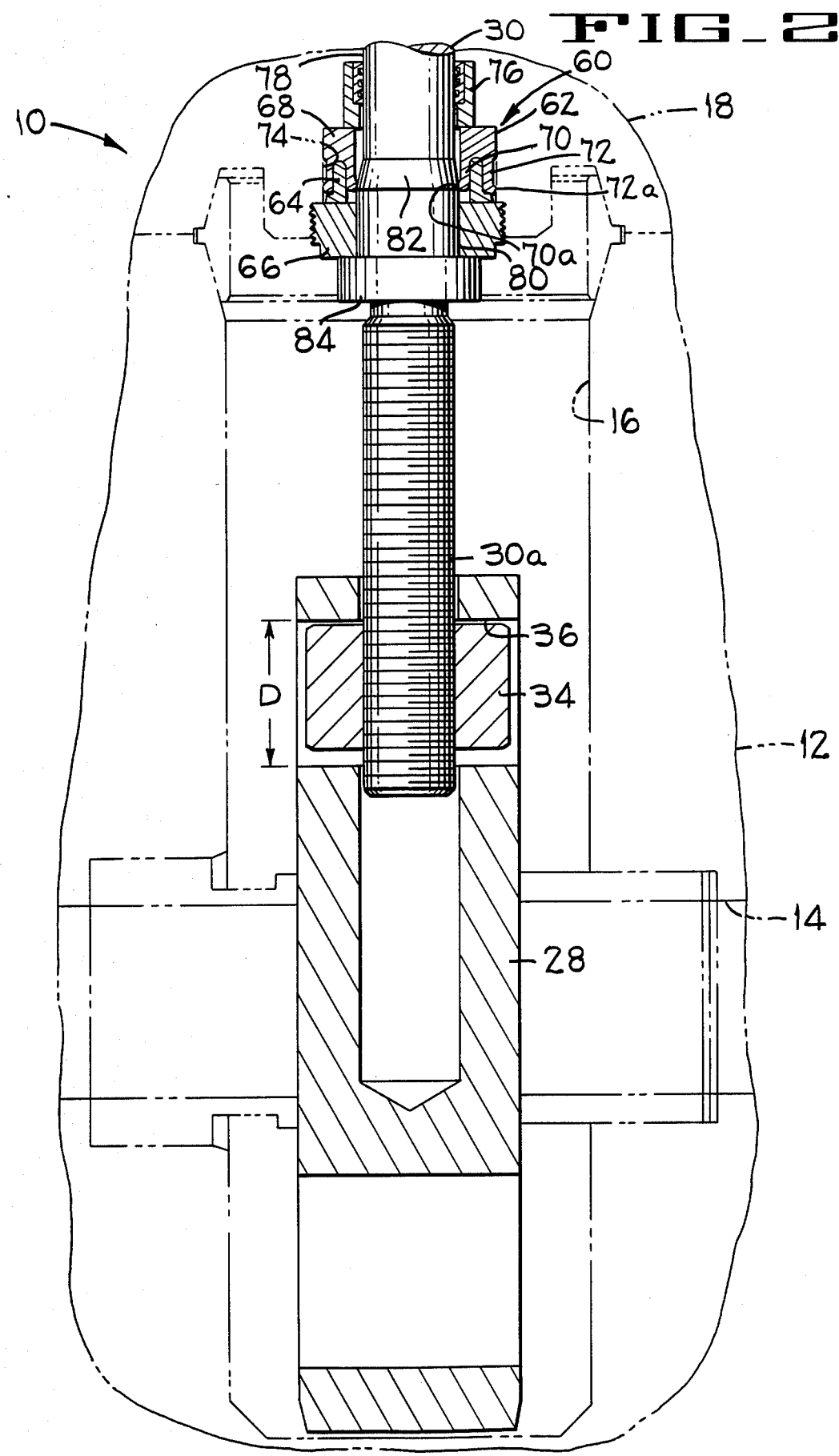

VALVE STEM-TO-BONNET BACKSEAT

BACKGROUND OF THE INVENTION

This invention relates to fire-resistant valves, and more particularly to metal-to-metal backseats for providing a fire-resistant seal between the stem and the bonnet of a gate valve.

As reflected in patents and other literature, much effort has been expended in recent years to provide industry, and especially that involved in oil and gas production, with stem operated valves that will withstand the destructive effects of fire or other high temperatures without losing their function of safe, fluid-tight control of high pressure systems. This effort has resulted in a variety of designs for valves with metal-to-metal seals, stem backseating, and fusible elements to prevent backseating during normal operating temperatures yet facilitate backseating when such temperatures are exceeded. The requirements for fire-resistant wellhead valves have become very stringent, including zero leakage at low operating pressure, a very difficult result to achieve especially with respect to the stem-to-bonnet backseat. In addition, the backseat seal must not be susceptible to leakage because of modest misalignment of the stem-to-backseat seal, modest interference tolerances, material cost/selection/availability, or design reliability.

SUMMARY OF THE INVENTION

The present invention comprises an improved valve stem-to-bonnet backseat that complies with the aforementioned requirements in a unique and highly satisfactory manner to provide a zero leakage metal-to-metal seal between the valve stem and bonnet under low as well as high operating pressure, and at low to extremely elevated temperatures such as in a wellhead fire exposure condition. This backseat includes an annular metal seal element of generally inverted U-shape in cross-section, and having inner and outer annular sealing lips round (radiused) sealing surface configuration, the inner lip establishing a metal-to-metal seal with the valve stem, and the outer lip establishing such a seal with the valve bonnet. When properly installed in a gate or other stem-type valve and during normal valve operations (open or closed) with fluid pressure in the valve body, this seal element resides in an annular chamber in the valve bonnet with its outer lip in sealing engagement with an axial surface of the chamber, and with its inner lip surrounding, but out of engagement wiht an adjacent first cylindrical surface of the valve stem. The stem has a first cylindrical surface and a tapered annular surface, i.e., frusto-conical, that extends from that first surface to a second cylindrical surface of larger diameter than the first, so that backseating the stem is achieved by translation of the stem with respect to the seal element, either manually or by action of certain valve components and/or pressure in response to elevated temperature, until the stem's tapered or its second cylindrical surface resides within the seal element's inner lip. At low operating pressures, as this axial movement of the stem occurs, the tapered surface of the stem forces the seal element's inner lip to expand (by interference fit), resulting in a secure, zero leakage metal-to-metal seal between the tapered surface of the stem and the seal element. At higher operating pressures the seal element's inner lip expands fully enough to accommodate entry of the second cylindrical surface, resulting in a secure, zero leakage metal-to-metal seal between the stem and the seal element.

In order that the foregoing backseating operation can be accomplished automatically in the event of a fire, the valve stem is spring biased towards its backseated position and a eutectic (fusible) element in provided to restrain translation fo the stem in that direction under ordinary temperatures. Thus, when the eutectic melts, the spring and valve body pressure on the stem forces the stem into sealing engagement with the seal element. The preferred embodiment also includes a lost motion connection between the stem and the gate to facilitate easy stem translation into its backseated position independent of gate movement from its closed position, thereby freeing the stem from the significant forces exerted by fluid pressure in the body tending to keep the valve closed.

BRIEF DESCRIPTION OF THE DRAWINGS

FIG. 1 is a central vertical section through a gate valve embodying the features of the present invention, showing the valve closed and the stem not backseated.

FIG. 2 is an enlargement of the central and lower portion of FIG. 1, but showing the stem in its backseated position.

DESCRIPTION OF THE PREFERRED EMBODIMENT

As illustrated in FIG. 1, the preferred embodiment of an improved fire-resistant gate valve 10 having features of the present invention comprises a body 12 with a flow passage 14, a valve chamber 16 intersected by the flow passage 14, a valve bonnet 18 releasably secured to the body 12 as by a plurality of circumferentially spaced studs 20 and nuts 22, a bonnet cap 24 secured to the bonnet 18 by threads 26, a valve gate 28 disposed in the chamber 16 to control flow through the passage 14, a non-rising valve stem 30 extending from the gate 28 through the bonnet 18 and the cap 24, and a handwheel 32 or other suitable means for rotating the stem 30. The stem 30 is threaded at 30a into a lift pin 34 that resides in a vertically elongated transverse slot 36 through the gate 28, so that as the stem is rotated, and after initially overcoming the lost motion (elongated hole), the gate is translated between its closed position (illustrated) and its open position (not shown) in the valve chamber 16 of the body 12. Although the valve chamber 16 is shown in its preferred embodiment as a circular cavity, the cavity could be rectangular, square, etc., in cross section. The valve chamber 16 is used to align the valve gate 28 properly. The valve gate 28 would be shaped to conform with the valve chamber 16, i.e., circular, rectangular, square, etc.

Near the upper end of the bonnet 18 is an annular packing 38 that provides a fluid seal, for normal operating conditions, between the bonnet and the stem 30, and a junk ring 40, held in place by a spring housing 42 threaded into the bonnet, serves as a retainer for the packing. Above the spring housing 42 the stem 30 is surrounded by a pair of thrust bearing assemblies 44, 46 that facilitate easy rotation of the stem to open and close the valve.

Between the bearing assemblies 44, 46 is a eutectic ring assembly 48 (FIG. 1) that axially supports the stem 30 in its illustrated position during normal operating temperatures. The assembly 48 comprises an axially-split sleeve 50 with an annular radial flange 50a extending outwardly from its lower end, a retaining ring 52 with an annular radial flange 52a extending inwardly from its upper end, and a eutectic ring 54 sandwiched between the flanges 50a, 52a. The sleeve 50 is formed by two equal half-round segments (only one shown) that fit around a reduced diameter stem portion 30b and between opposed annular shoulders 30c, 30d. The retaining ring 52 freely surrounds the sleeve 50 and the eutectic ring 54, and has one or more lateral ports (not shown) through which material of the ring 54 can exit after being melted by a fire or other sufficiently elevated temperature. Secured to the upper end of the bonnet cap 24 is an annular shroud 58, with a radial end wall 58a, that provides a degree of fire protection to the enclosed valve components.

As perhaps seen best in FIG. 2, the valve 10 further includes an improved stem-to-bonnet backseat of unique design that provides a positive metal-to-metal seal over a wide range of pressures and temperatures. This backseat comprises a seal assembly 60 including an annular metal seal 62, an annular spacer 64, and a retainer nut 66. The seal 62 has a base portion 68 from which axially extend a pair of annular flanges or lips 70, 72, the inner lip 70 having an inner sealing surface 70a of round (radiused) cross-sectional configuration to establish a metal-to-metal seal with the valve stem 30, and the outer lip 72 having an outer sealing surface 72a, also of round (radiused) cross-sectional configuration, to establish a metal-to-metal seal with the valve bonnet 18. The spacer 64 prevents translation (or rotation) of the seal 62 during disengagement of the valve stem 30 from the seal, and also is employed to install the seal in its annular chamber 74 in the bonnet 18. The retainer nut 66 is externally threaded into the bonnet 18, and thus prevents the seal 62 from unseating from the bonnet during disengagement of the stem 30 from the seal. Should it be desired, a snap ring (not shown) could be used instead of the retainer nut 66.

Above (as viewed in the drawings) the backseat seal assembly 60 is a combination cast iron/viton bushing 76 to maintain alignment of the stem 30 for backseating while providing assistance in centering the stem for valve service life (open-close cycling) operations.

Again as viewed best in FIG. 2, the valve stem 30 has a first cylindrical surface 78, a second cylindrical surface 80 of larger diameter than the surface 78, and an intermediate tapered (frusto-conical) annular surface 82 extending between the first and second cylindrical surfaces 78, 80. As seen in FIG. 1, when the stem 30 is not backseated, such as during normal operating conditions, the inner lip 70 of the backseat seal 62 is not in contact with the stem. When the stem 30 is backseated the seal's inner lip 70 is in fluid-tight contact with either the tapered surface 82 or the second cylindrical surface 80 of the stem, as illustrated in FIG. 2. The stem 30 also has an annular radial stop flange 84 that cooperates with the retainer nut 66 to prevent further upward (as viewed in FIGS. 1 and 2) translation of the stem once backseating has been accomplished (FIG. 2).

As shown in FIG. 1, the stem 30 is biased towards its backseated position by a helical spring 86 that is axially compressed between the bottom of the spring housing 42 and an annular spring retainer 88. The spring retainer 88 is held against the bonnet 18 indirectly by the bonnet cap 24, and is restricted from relative axial movement with respect to the stem 30 by the thrust bearing assembly 44 and the split sleeve 50. Accordingly, to backseat the stem 30 manually the bonnet cap 24 is rotated in the direction causing its unthreading from the bonnet 18, thereby releasing the restraint on the spring retainer 88 and allowing the spring 86 to force the stem axially towards it backseated position as shown in FIG. 2. As this axial movement occurs the tapered surface 82 of the stem engages the seal lip 70 and causes the lip to expand (by interference fit), effecting a metal-to-metal seal at low, as well as high, valve body pressures. It should be noted that accomplishing low pressure sealing is the most difficult, and that the backseat system of this invention effects a highly satisfactory low (and high) pressure seal without requiring extremely critical manufacturing tolerances and alignments.

With stem 30 backseated (FIG. 2) the bonnet cap 24 can be removed to provide access to the stem packing 38 for servicing or replacement thereof. As the bonnet cap 24 is threaded back onto the bonnet 18 the stem 30 is forced off its backseated position into its normal operating position shown in FIG. 1.

When the eutectic ring 54 melts, as will occur when the valve 10 is subjected to an oil or gas well fire or other sufficiently high temperature, the stem 30 translates from its operating position (FIG. 1) to its backseated position (FIG. 2) in response to force exerted on it by the spring 86 and/or valve body pressure.

As seen best in FIG. 2, the diameter of the valve gate lift pin 34 is considerably less than the dimension D of the vertically elongated slot 36 in the valve gate 28 through which the pin extends, thereby providing a lost motion connection between the stem 30 and the gate. Accordingly, when the backseating operation is accomplished while the valve is closed (FIGS. 1 and 2), the valve stem 30 translates without movement of the valve gate 28. This feature significantly reduces the force required to translate the stem 30, and assists in maintaining zero leakage between the valve stem and the inner lip of the seal as is so critically important during a fire. This feature also reduces the potential possibility of leakage between the gate and seats during the backseating operation by precluding motion between the gate and seat during said operations.

It should be understood that the present invention provides several advantages over previous methods for backseating the stem of a fire-resistant or other high performance valve, including the following.

(1) Metal-to-metal sealing where positive displacement of the seal during backseat seal-to-stem activation may or may not cause the seal to permanently yield (to a limited extend) to conform to the mating stem sealing surface. If partial yielding is designed into the lips they still have enough spring force to maintain a permanent metal-to-metal seal even after multiple backseating operations, and also after exposure to elevated temperatures.

(2) The metal-to-metal backseat seal is releasably retained in the bonnet by a locknut or snap ring, and thus field service replacement of the seal is possible.

(3) Since seal geometry is designed to accommodate some misalignment between the stem and backseat seal, seal engagement is not dependent on totally perfect alignment.

(4) The seal will accommodate some limited inadvertent rotation of the stem in the backseat position and still maintain a positive metal-to-metal seal.

(5) The stem and seal will facilitate multiple backseat sealing operations over the operating life of the valve.

(6) The backseating operation does not require movement of the valve gate during backseating of the stem when the valve is in either the open or closed position.

(7) The backseating operation can be achieved by a stem-translating force exerted by (a) internal valve body fluid pressure, (b) the helical spring 86, or (c) a combination of (a) and (b).

Although the best mode contemplated for carrying out the present invention has been herein shown and described, it will be apparent that modification and variation may be made without departing from what is regarded to be the subject matter of the invention.

We claim:

1. A valve comprising a body with a flow passage extending therethrough and a chamber intersected by said flow passage;
   a valve closure element positioned in said chamber to control flow through said flow passage;
   a bonnet secured to said body and having a bore communicating with said chamber;
   a valve stem extending through said bore and connected to said closure elements; and
   means for backseating said stem on said bonnet in response to axial movement of said stem and respect to said bonnet, said backseating means comprising an annular metal seal element of generally U-shape in cross-section, said seal element including inner and outer annular sealing lips having a round sealing surface configuration, said inner and outer lips functioning to establish a metal-to-metal seal with said valve stem and said bonnet.

2. A valve according to claim 1 wherein the metal seal element is removably secured to the bonnet for servicing and/or replacement in the field.

3. A valve according to claim 2 wherein the seal element is retained in an annular seal chamber in the bonnet by a removable retainer.

4. A valve according to claim 3 wherein the removable retainer comprises an annular nut threaded to the bonnet.

5. A valve according to claim 3 wherein the removable retainer comprises a snap ring.

6. A valve according to claim 1 wherein the metal seal element includes an annular base portion, and wherein the inner and outer sealing lips extend axially from said base protion.

7. A valve according to claim 1 including spacer means between the inner and outer lips for preventing dislocation of the metal seal element during translation of the valve stem.

8. A valve according to claim 1 wherein the valve stem has two cylindrical surfaces of unequal diameter, and a tapered annular surface intermediate said two cylindrical surfaces.

9. A valve according to claim 8 wherein the inner lip sealing surface is in fluid-tight contact with the tapered annular surface of the valve stem when the stem is backseated.

10. A valve according to claim 8 wherein the inner lip sealing surface is in fluid-tight contact with the larger diameter cylindrical surface of the valve stem when the stem is backseated.

11. A valve according to claim 1 including a lost motion connection between the valve stem and the valve closure element.

12. A valve according to claim 11 wherein the lost motion connection facilitates backseating the valve stem without movement of the valve closure element from its closed position.

13. A valve according to claim 11 wherein the lost motion connection comprises a lift pin attached to the valve stem and an elongated slot in the valve closure element in which said lift pin resides.

14. A valve according to claim 1 including eutectic means for releasably retaining said valve stem in unbackseated condition, said eutectic means comprising a ring of eutectic material and a support sleeve surrounded by and supportive of said ring, said support sleeve surrounding and secured to said stem for unitary axial movement therewith, said ring cooperating with said bonnet to prevent said unitary axial movement until melting of said ring has occurred.

15. A valve according to claim 14 wherein said support sleeve includes an outwardly extending radial flange upon which said ring is supported.

16. A valve according to claim 15 including a retaining ring surrounding said stem, said eutectic ring sandwiched between said retaining ring and said support sleeve.

17. A valve according to claim 16 wherein said retaining ring includes an annular radial flange, and wherein said eutectic ring resides between said retaining ring flange and said support sleeve flange.

18. A valve according to claim 16 wherein said support sleeve and said retaining ring substantially enclose said eutectic ring.

19. A valve according to claim 15 including first bearing means surrounding said stem above said eutectic ring, said bearing means cooperating with said ring and said bonnet to prevent axial movement of said stem.

20. A valve according to claim 19 including second bearing means surrounding said stem below said eutectic ring.

21. A valve according to claim 14 including spring means surrounding said stem and urging said support sleeve, said eutectic ring and said stem axially in a direction away from said chamber.

* * * * *